Oct. 5, 1943.   R. GOLDSCHMIDT   2,331,116
FLEXIBLE HOLLOW CONDUCTOR
Filed March 19, 1941   2 Sheets-Sheet 1
  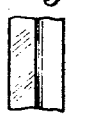  
Fig.1   Fig.3   Fig.5   Fig.7   Fig.9
    
Fig.2   Fig.4   Fig.6   Fig.8   Fig.10
 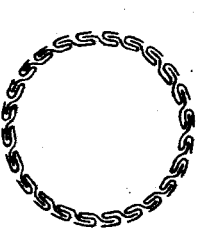 
Fig.11   Fig.12   Fig.13
 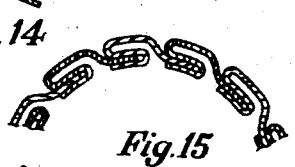 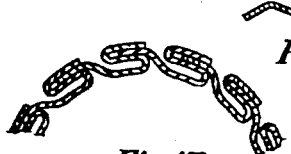 
Fig.14   Fig.15   Fig.17   Fig.16
 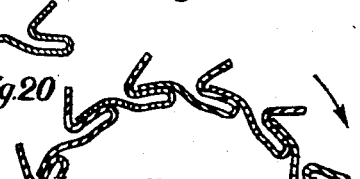 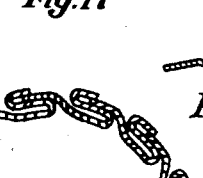 
Fig.20   Fig.21   Fig.19   Fig.18
Fig.22
Fig.23
INVENTOR
Robert Goldschmidt
BY Frederich E. Halem

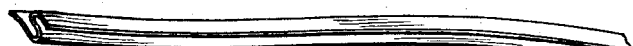
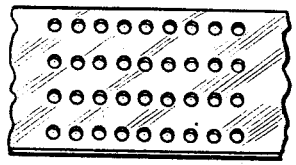 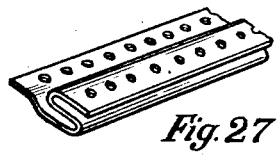
 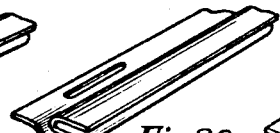 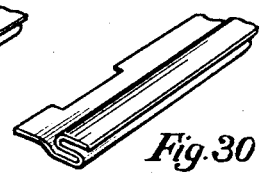
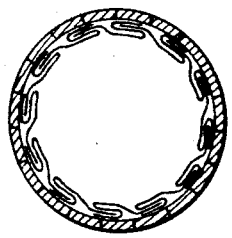 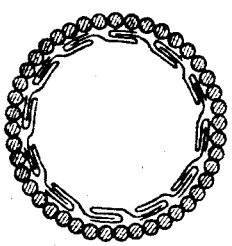
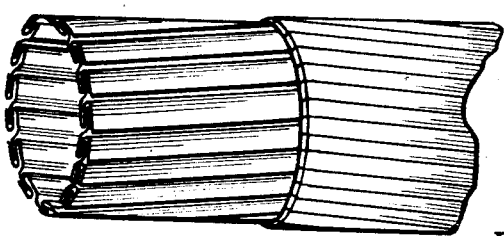

Patented Oct. 5, 1943

2,331,116

UNITED STATES PATENT OFFICE 2,331,116

FLEXIBLE HOLLOW CONDUCTOR

Robert Goldschmidt, Pully, near Lausanne, Switzerland

Application March 19, 1941, Serial No. 384,216
In Switzerland March 21, 1940

6 Claims. (Cl. 174—130)

My invention relates to improvements in flexible tubes, more particularly to hollow conductors for electrical currents, whose forming elements are thin bands many times folded on themselves.

Such tubes are used as electrical current conductors either for overhead or underground lines. As to underground lines one must distinguish between heavy current lines and low current lines which include particularly high frequency current lines. For such use the electrical resistance of the tube should not be much higher than the resistance of a rigid tube having about the same dimensions.

The principal object of my invention is to provide a flexible hollow conductor for electrical currents composed of a plurality of axially laid strips, each strip being made of sheet metal and having a substantially S-shaped cross section, one arm of said S being extended into a tongue for interlockingly engaging an adjacent strip. A hollow conductor according to my invention can be easily and inexpensively manufactured and its electrical resistance is substantially the same as the resistance of a rigid tube having about the same dimensions. The novel features which I believe to be characteristic of my invention are set forth in the appended claims.

My invention may be understood by reference to the following description taken in connection with the accompanying drawings.

The Figures 1 and 2 are a plan view and a sectional view of a thin band.

The Figures 3 and 4 are a plan view and a sectional view of this band after a first folding.

The Figures 5 and 6 are a plan view and a sectional view of this band after a second folding.

The Figures 7 and 8 are a plan view and a sectional view of this band after folding the tonguelike strip.

The Figures 9 and 10 are a plan view and a sectional view of several interlocking bands.

The Figure 11 is a vertical section of a band whose tonguelike strip is folded backward.

The Figure 12 is a vertical section of a tube composed of elements as shown in Figure 11.

The Figure 13 is a side view of a tube according to Figure 12.

The Figure 14 is a vertical section of a band whose tonguelike strip is folded forward.

The Figure 15 is a vertical section of a tube composed of elements shown in Figure 14.

The Figure 16 is a vertical section of a folded band whose tonguelike strip is shorter.

The Figure 17 is a vertical section of a tube composed of elements as shown in Figure 16.

The Figure 18 is a vertical section of a folded band whose free branch of the S is shortened.

The Figure 19 is a vertical section of a tube composed of elements as shown in Figure 18.

The Figure 20 is a vertical section of a band folded incompletely.

The Figure 21 is a vertical section of a tube composed of elements as shown in Figure 20, the tonguelike protruding strips are afterwards pressed down by a suitable conventional device revolving in the direction of the arrow so as to form a smooth and tight tube.

The Figure 22 is a view of a folded band undulated longitudinally.

The Figure 23 is a side view of a tube composed of elements as shown in Figure 22, the elements being arranged parallel to the axis of the tube.

The Figure 24 is a view of a folded band undulated in such a manner that the parallel lines joining the maxima or minima of the undulation are more than 90 degrees inclined to the axis of the band.

The Figure 25 is a view of a tube composed of elements as shown in Figure 24, these elements being arranged parallel to the axis of the tube so that the undulation forms a spiral all along the tube.

The Figure 26 is a view of a perforated band.

The Figure 27 is a view of this band folded like Figures 7 and 8.

The Figures 28, 29 and 30 are views of folded bands with slits or notches.

The Figure 31 is a vertical section of a hollow tube comprising a tube as shown in Figure 13 covered by a layer of protective wires.

The Figure 32 is a similar view but the outer layer formed by wires have a round cross section.

The Figure 33 is a side view of a tube as shown in Figure 31.

Each folded band has an S-shaped cross-section one arm of which is free while the other is extended into a tongue. The width and the thickness of the band are a function of the properties of the used material and of the intended application. For electric conductors made of copper a thickness of 0.2 mm. is proper for tubes up to a diameter of 30 mm. If the tube is composed of bands of insulating matter like paper or synthetics (for example cellulose derivatives, styrol products) the thickness can be reduced. A tube according to the invention can also be formed with bands of metalised paper. In this case it may be sufficient to metalise only those parts of the band which form either the outer or inner side of the tube or the tonguelike strip fitted into the loop of the S. To permit the elements to interlock easily and to form the tube it is necessary for the tonguelike lateral strips to be bent up at a predetermined angle. There are two possibilities to do so as shown in Figures 11 and 14. In the first case the free arm of the S is disposed on the outside of the tube. This arrangement is preferable if the inside of the tube shall be free of sharp edges, for instance when the tube is to be used as an external conductor of a high frequency cable. In the other case the free arm of the S is placed on the inside of the tube. This arrangement is preferable for a hollow inner conductor of an oil filled power cable. In this case it is the outside of the tube which shall be free of sharp edges. It is sometimes advantageous that as shown in Figures 16 and 18 either the free arm of the S or the tonguelike strip is shorter. This facilitates the interlocking of the bands and saves material. The Figures 17 and 19 are vertical sections of tubes composed of such elements.

In order to obtain a flexible tube composed of interlocking elements, it is necessary to twist the elements into a certain angle as shown in Figure 13 or to undulate these elements longitudinally as shown in Figures 22 and 24 in such a manner that the undulation assumes the shape shown in Figure 23 or in Figure 25. As previously mentioned a hollow conductor according to the invention can be used for the transmission of heavy currents or low currents specially those having a high frequency either as conductors in a cable or as overhead line. If the tube serves as a hollow tube of an oil filled high tension cable it is favorable to provide holes through which the oil can pass. These holes can be circular or elongated (Figures 27 and 28). Instead of holes, through the four branches of the band it may be sufficient to have slits (Figure 29) or notches (Figure 30), where the interlocking bands are in contact.

If the tube is to be used as a hollow conductor for overhead lines, layers of profiled (Figures 31 and 33) or round wires (Figure 32) can be placed about the tube.

Outside the hollow flexible tube layers of metallic bands with or without interlocking can be placed or the tube can be surrounded by insulating coats made of rubber, paper, textiles or synthetic materials. This coat of insulating matter can be placed directly on the tube or over the layers of metallic armor surrounding the flexible tube.

Having thus described my invention, what I claim as new and desire to secure by Letters Patent is:

1. Flexible hollow conductor for electric currents composed of a plurality of axially laid strips each strip being made of sheet metal and having a substantially S-shaped cross section, one arm of said S being extended into a tongue for interlockingly engaging an adjacent strip.

2. Flexible hollow conductor for electric currents comprising a plurality of axially laid strips, each strip being made of sheet metal and having a cross section substantially shaped like a standing S, one arm of said S being extended into a tongue interlockingly engaging a loop formed between two S-arms of an adjacent strip.

3. Flexible hollow conductor for electric currents comprising a plurality of strips, each strip being made of sheet metal and having a substantially S-shaped cross section, one arm of said S being extended into a tongue for interlockingly engaging a loop formed between two S-arms of an adjacent strip, said strips being laid to form an extending helix.

4. Flexible hollow conductor for electric currents composed of an internal tube comprising a plurality of axially laid strips each strip being made of sheet metal and having a cross section substantially shaped like a standing S, one arm of said S being extended into a tongue, said tongue interlockingly engaging a loop formed between two S-arms of an adjacent strip and an external tube encasing said internal tube.

5. Flexible hollow conductor for electric currents according to claim 4 in which said external tube comprises profiled metal wires wound in layers around said internal tube.

6. Flexible hollow conductor for electric currents according to claim 4 in which said external tube is formed by a layer of insulating material.

ROBERT GOLDSCHMIDT.